(12) United States Patent
Ho et al.

(10) Patent No.: US 10,567,396 B2
(45) Date of Patent: Feb. 18, 2020

(54) REAL-TIME SCANNING OF IP ADDRESSES

(71) Applicant: Webroot Inc., Broomfield, CO (US)

(72) Inventors: Huy Dang Ho, San Diego, CA (US);
Hal Lonas, San Diego, CA (US);
Trung Tran, San Diego, CA (US)

(73) Assignee: Webroot Inc., Broomfield, CO (US)

( * ) Notice: Subject to any disclaimer, the term of this patent is extended or adjusted under 35 U.S.C. 154(b) by 53 days.

(21) Appl. No.: 15/063,590

(22) Filed: Mar. 8, 2016

(65) Prior Publication Data

US 2017/0171221 A1  Jun. 15, 2017

Related U.S. Application Data

(60) Provisional application No. 62/267,431, filed on Dec. 15, 2015.

(51) Int. Cl.
*G06F 21/57* (2013.01)
*H04L 29/06* (2006.01)
*H04L 29/12* (2006.01)

(52) U.S. Cl.
CPC ............ *H04L 63/14* (2013.01); *G06F 21/577* (2013.01); *H04L 61/2503* (2013.01); *H04L 63/1433* (2013.01); *H04L 61/6068* (2013.01)

(58) Field of Classification Search
CPC .......................... G06F 21/577; H04L 63/1433
USPC .......................................................... 726/23
See application file for complete search history.

(56) References Cited

U.S. PATENT DOCUMENTS

| | | | |
|---|---|---|---|
| 7,630,381 B1 | 12/2009 | Roskind et al. | |
| 2001/0034847 A1* | 10/2001 | Gaul, Jr. | H04L 63/1433 726/25 |
| 2003/0056116 A1* | 3/2003 | Bunker, V | H04L 43/00 726/25 |
| 2009/0222920 A1* | 9/2009 | Chow | G06F 21/566 726/23 |
| 2010/0235917 A1* | 9/2010 | Ku | H04L 63/1433 726/25 |
| 2011/0214157 A1* | 9/2011 | Korsunsky | G06F 21/55 726/1 |

(Continued)

FOREIGN PATENT DOCUMENTS

EP    2843904    3/2015

OTHER PUBLICATIONS

PCT International Search Report in PCT/US2016/066897, dated Mar. 15, 2017, 15 pages.

(Continued)

*Primary Examiner* — David J Pearson

(57) ABSTRACT

Examples of the present disclosure describe systems and methods of providing real-time scanning of IP addresses. In aspects, input may be received by a real-time IP scanning system. The system may generate one or more work orders based on the input. A scanner associated with the system may access a work order and attempt to communicate with one or more devices identified by the work order. If the attempted communication with a device is successful, a protocol analyzer may be used to provide a predefined payload to the device. If the response from the device matches an expected string, the device may be determined to be a safe and/or legitimate device. If the response from the device does not match an expected string, the device may be determined to be a malicious device.

20 Claims, 4 Drawing Sheets

(56) References Cited

U.S. PATENT DOCUMENTS

| | | | | |
|---|---|---|---|---|
| 2011/0321164 | A1* | 12/2011 | Saxena | G06F 21/577 726/25 |
| 2012/0304297 | A1 | 11/2012 | Chung et al. | |
| 2014/0282843 | A1* | 9/2014 | Buruganahalli | H04L 63/0428 726/1 |
| 2015/0161386 | A1* | 6/2015 | Gupta | G06F 11/3612 726/23 |
| 2016/0006749 | A1* | 1/2016 | Cohen | G06Q 40/12 726/23 |
| 2016/0099960 | A1* | 4/2016 | Gerritz | H04L 63/145 726/23 |
| 2017/0085579 | A1* | 3/2017 | Ionescu | H04L 63/1416 |
| 2017/0093795 | A1* | 3/2017 | Fruth | H04L 63/02 |

OTHER PUBLICATIONS

PCT International Preliminary Report on Patentability in PCT/US2016/066897, dated Jun. 19, 2018, 8 pages.

* cited by examiner

REAL-TIME SCANNING OF IP ADDRESSES

RELATED APPLICATIONS

This application claims the benefit of and priority to U.S. patent application Ser. No. 62/267,431, filed Dec. 15, 2015, entitled "Real-time Scanning of IP Addresses," which application is incorporated herein by reference in its entirety.

BACKGROUND

Internet protocol (IP) and port scanning technologies provide the ability to monitor and manage network systems. IP scanning technologies allow users (e.g., system administrators, general user, etc.) to identify IP addresses, ports, protocols and/or service to detect, for example, malicious content and behavior. Typically, IP scanning technologies utilize methods that are time-consuming and resource intensive. As a result, such technologies are unable to detect and/or identify many harmful Internet entities that are present for a brief period of time, such as some phishing sites, botnets, open web proxies, etc.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of providing real-time scanning of IP addresses. In aspects, input may be received by a real-time IP scanning system. The system may generate one or more work orders based on the input. A scanner associated with the system may access a work order and attempt to communicate with one or more devices identified by the work order. If the attempted communication with a device is successful, a protocol analyzer may be used to provide a predefined payload to the device. If the response from the device matches an expected string, the device may be determined to be a safe and/or legitimate device. If the response from the device does not match an expected string, the device may be determined to be a malicious device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
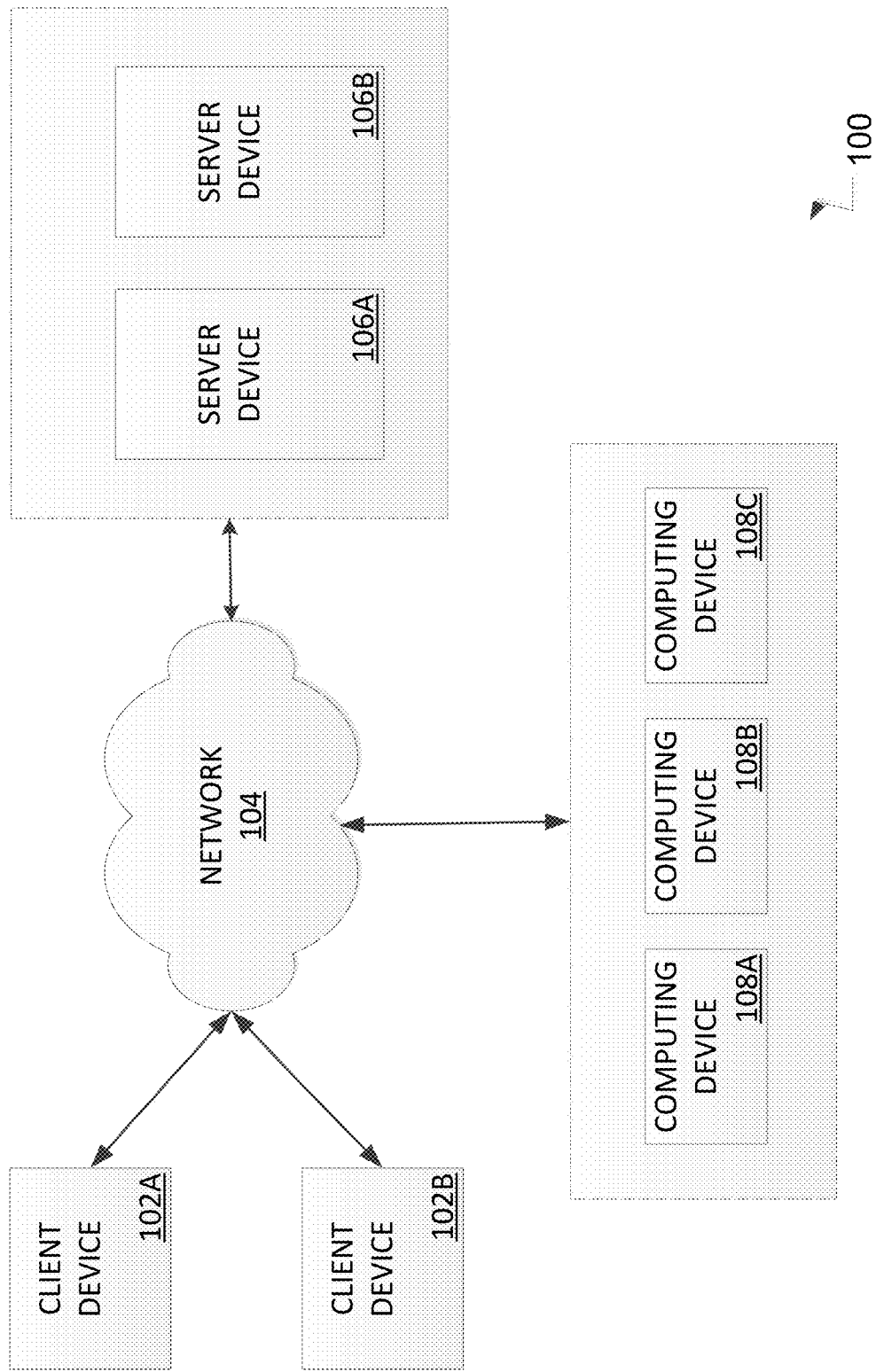
FIG. 1 illustrates an overview of an example environment for providing real-time scanning of IP addresses as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describe systems and methods of providing real-time scanning of IP addresses. Real-time, as used herein, may refer to a specified time frame that is in the order of milliseconds or microseconds. In examples, input may be received by an IP scanning system. In aspects, the input may be processed in a form such as voice/utterance, text, handwritten input, and touch, among other examples. Further, the input may comprise user and/or client data, request data, timer data, device information (e.g., IP address, MAC address, protocol data, port information, etc.), and the like. The system may generate one or more work orders (e.g., job requests) based on the input. In examples, a work order may comprise one or more portions of the input, a work order identification, network data, and the like. Further, the work orders may be immediately processed or stored for processing in one or more message queues or a data store, such as a database or file.

In some aspects, one or more scanners associated with the system may access a work order and attempt to communicate with one or more devices, services, protocols and/or ports identified by the work order. A scanner, as used herein, may refer to a device or one or more device components for communicating with one or more computing devices to, for example, determine whether the computing devices are active, resolve identifying information for the computing devices, scan ports and identify services on the computing devices, etc. In some examples, if the attempted communication with a device is successful, a device indication for the device may be received by the system. In at least one example, the device indication may include an IP address, a device name, a uniform resource locator (URL) and/or the like. The device indication may be immediately processed or may be stored for processing in one or more message queues or a data store.

In aspects, one or more protocol analyzers associated with the system may access at least one or more of the device indications. The protocol analyzers may be configured to identify and/or determine information related to the computing devices identified by the device indication using the work order, device indication information, and/or other information. For example, a protocol analyzer may identify that a device indication or a work order comprising similar device indications corresponds to a particular protocol (e.g., Internet Control Message protocol (ICMP), Transmission Control Protocol (TCP), User Datagram Protocol (UDP), etc.), or service (e.g., File Transmission Protocol (FTP), Hypertext Transfer Protocol (HTTP), Simple File Transfer Protocol (SFTP), etc.). In a particular example, a protocol analyzer may be configured to access and/or process only certain types of work orders, devices, protocols, services and/or identifying information. In such an example, protocol analyzers may be grouped and/or assigned according to identified functionality.

In some aspects, a protocol analyzer may use the determined information to access a payload stored on the system or accessible to the system. A payload, as used herein, may refer to a stream of data, portions of a file, or a file. In one example, a payload comprises data that may be used to solicit a response from the type of device indicated by the identifying information. For example, a payload for a domain name server (DNS) server may include data and instructions configured to support a UDP wrapper and to receive a corresponding response from a computing device, whereas a payload for a FTP server may include data and instructions configured to support a FTP wrapper and to receive a different corresponding response from a computing device. In other examples, the payload may additionally or alternately comprise data that may be used to detect malicious content and/or behavior on a computing device. In such an example, the payload may be generated by, for example, reverse engineering known data and/or using pattern matching techniques on known data. Known data, as used herein, may refer to data that has been previously analyzed to determine the presence of malicious content, or data that has been identified to comprise malicious content.

In aspects, the protocol analyzers may transmit the accessed payload to the device indicated by the identifying information. In examples, a plurality of protocol analyzers may be executed simultaneously and independently from each other, such that a plurality of payloads are simultaneously being transmitted to a plurality of computing devices. In such examples, this simultaneous (or near-simultaneous) execution of protocol analyzers may provide for the analysis of a plurality of IP addresses (e.g., a designated range of IP addresses, the entire IPv4 and/or IPv6 space, etc.) in approximately real time. In some aspects, if the response from the computing device matches a string expected by the system, the system may mark (or otherwise identify) the computing device accordingly. In at least one example, the mark may indicate that the computing device is a safe and/or legitimate device. If the response from the device does not match an expected string by the system, the system may mark (or otherwise identify) the computing device accordingly (e.g., the device may be marked as malicious or potentially unsafe). In aspects, the responses from the computing devices and/or the marks made by the system may be stored on the system or in a location accessible to the system. For example, responses and/or marks may be copied to a historical analysis log that may be stored on the system and/or provided to a service or device.

Accordingly, the present disclosure provides a plurality of technical benefits including but not limited to: almost real time detection of malicious internet entities; multi-threaded IP scanning; reducing the time to perform scans for malicious internet entities; providing an accurate view of current internet trends; providing automatic, up-to-date threat detection and improving efficiency and quality for applications/services utilizing examples of the present disclosure, among other examples.

FIG. 1 illustrates an overview of an example environment for providing real-time scanning of IP addresses as described herein. Exemplary system 100 presented is a combination of interdependent components that interact to form an integrated whole for personalizing natural language systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an exemplary system 100 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices.

As one example, the system 100 comprises client device 102A, client device 102B, distributed network 104, a distributed server environment comprising one or more servers such as server device 106A and server device 106B, and an IP-scannable computing environment comprising one or more devices such as computing device 108A, computing device 108B and computing device 108C. One of skill in the art will appreciate that the scale of systems such as system 100 may vary and may include more or fewer components than those described in FIG. 1. In some examples, interfacing between components of the system 100 may occur remotely, for example where components of system 100 may be spread across one or more devices of a distributed network.

The client device 102A, for example, may be configured to receive user input via a user interface component or other input means. Examples of input may include voice, visual, touch and text input. In one example, the user interface component may provide access to a web portal that provides access to service and/or functionality of the real-time IP scanning system. In another example, the user interface component may provide access to a command line utility that provides access to the real-time IP scanning system. In yet another example, the user interface component may only allow a user to schedule one or more jobs or work orders to be submitted to the real-time IP scanning system, while precluding the user from directly accessing the system. Client device 102A may be further configured to transmit the input to a server device, such as server device 108, via distributed network 104.

Server device 106A may be configured to receive and process input from client devices, such as client device 102A. In examples, processing the input may include generating and/or managing work orders (e.g., job requests) for the real-time IP scanning system. For example, the server device 106A may receive work orders from client device 102A and client device 102B. Server device 106A may add the work orders to one or more job or message queues based on criteria such as order of receipt, requested functionality, estimated time of completion, estimated resource requirements, etc. Server device 106A may then access and process one or more of the received work orders. In some examples, processing a work order may include parsing the work order to identify, for example, a targeted IP range, port, service, protocol, etc. The identified information may be used to determine or generate a range of IP addresses or other device-identifying information. Server device 106A may then attempt to communicate with identified devices, such as computing device 108A-C, via, for example, a ping request (e.g., a network utility for detecting the reachability of a device), an Nmap request (e.g., a network mapping utility for discovering network data for a device) or similar requests. In at least one example, if an identified device responds to the communication request, server device 106A may add a device indicator for the identified device to one or more job or message queues.

Server device 106A may be further configured to access and process one or more device indicators. In examples, processing a device indicator may include determining a port, service, protocol, etc. associated with the device indicator and accessing a payload that is configured for the device. In at least one example, the payload may include data that may be used to solicit a response from a device type indicated by a device. For example, a device indicator may indicate that a computing device, such as computing device 108A, is a mail server. Server device 106A may access a payload that includes data and/or instructions to solicit an expected response to a mail server-specific request. In another example, the payload may additionally or alternately comprise data that may be used to detect malicious content and/or behavior on a computing device. For example, server device 106A may access a payload generated to detect botnets using, for example, pattern-matching techniques on known data. A botnet, as used herein, may refer to one or more Internet-connected computing devices that communicate with similar devices to complete tasks and/or objectives.

Server device 106A may be further configured to transmit a payload and process the corresponding response. In examples, server device 106A may transmit a payload to a computing device. In some examples, server device 106A may determine whether the response from the computing device matches an expected or acceptable string or value. When the response matches an expected string, server device 106A may mark, flag or otherwise designate the computing device and/or the associated device indicator as legitimate or non-malicious. When the response does not match an expected string, server device 106A may mark, flag or otherwise designate the computing device and/or the associated device indicator as illegitimate or malicious. In other examples, server device 106A may determine whether the response includes malicious content and/or the server exhibits malicious behavior. For example, even if the computing device provides an expected response for the identified computing device type, server device 106A may analyze the request to identify malicious scripts and content. In a particular example, when server device 106A detects malicious content in the response, server device 106A may mark, flag or otherwise designate the computing device and/or the associated device indicator as illegitimate or malicious.

Figure 2:
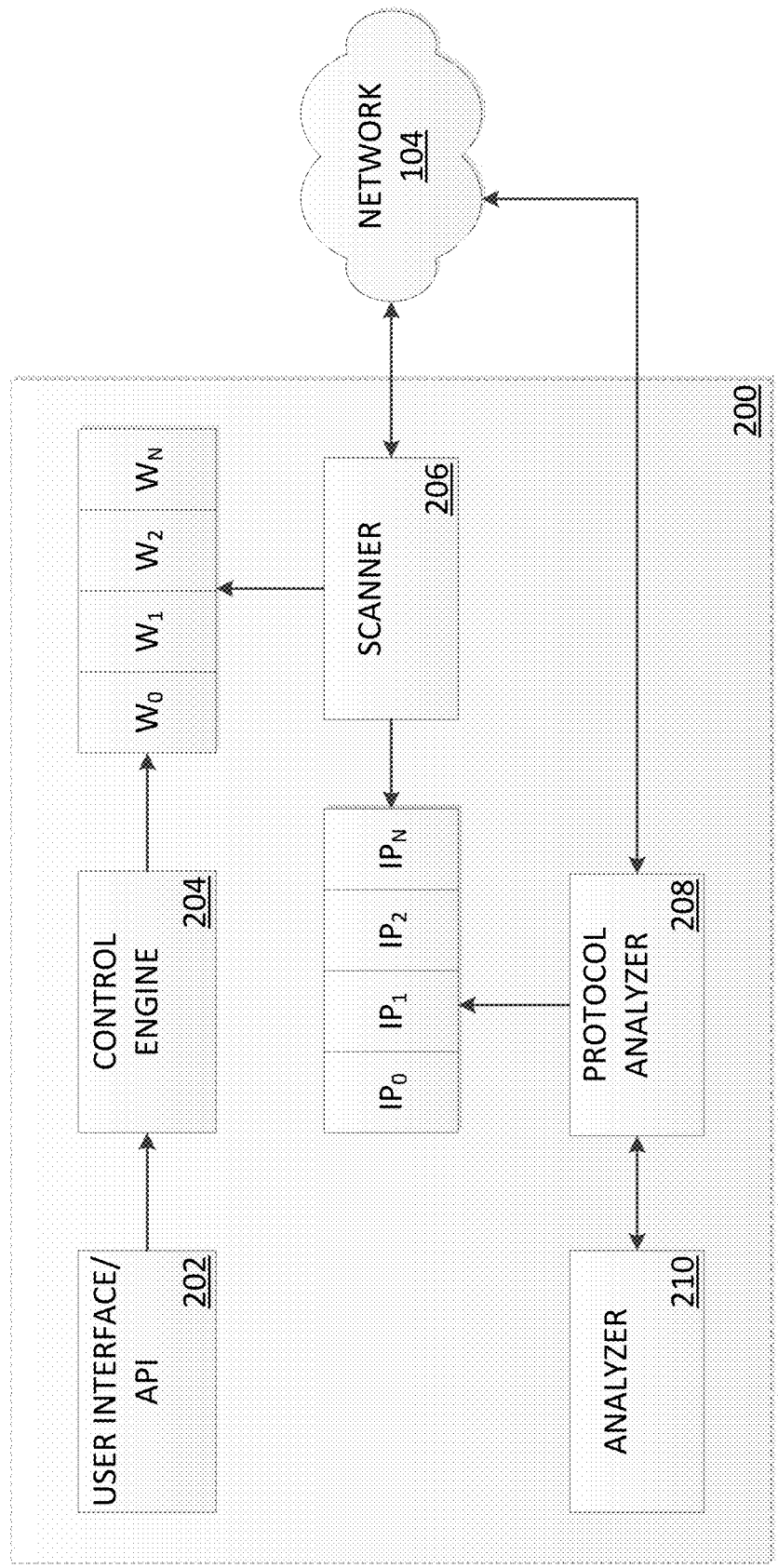
FIG. 2 illustrates an exemplary system for providing real-time scanning of IP addresses as described herein.

FIG. 2 illustrates an exemplary system 200 for providing real-time scanning of IP addresses for as described herein. The real-time scanning techniques implemented by system 200 may comprise the real-time scanning techniques and input described in FIG. 1. In alternative examples, a single system (comprising one or more components such as processor and/or memory) may perform processing described in systems 100 and 200, respectively. Further, system 200 may comprise a user interface component as described in the description of FIG. 1.

Exemplary system 200 may comprise user interface (UI) 202, control engine 204, scanner 206, protocol analyzer 208 and analyzer 210. The UI 202 may be a user interface or an API that is configured to receive input from a user, service and/or computing device. In some examples, UI 202 may additionally be configured to allow a user, service and/or computing device to set and/or modify system parameters, settings and resources. For instance, UI 202 may provide for modifying the list of protocols and/or services supported by the system; assigning particular protocols and/or services to protocol analyzers; setting system resource limitations (e.g., max thread counts, memory allocation, CPU usage, etc.); updating payload data; etc. In at least one example, UI 202 may transmit the received input to a control engine, such as control engine 204. Control engine 204 may be configured to generate one or more work order requests (e.g., job requests) based on the received input. In examples, control engine 204 may parse the received input to identify request data relating to, for example, one or more IP addresses, ports, services and/or protocols. Control engine 204 may use the identified information to generate a work order comprising one or more portions of the input. In some examples, control engine 204 may add the work orders to a message queue, such as a work order queue.

Scanner 206 may be configured to access the message queue (e.g., work order queue) and process work orders. In examples, scanner 206 may select or receive a work order to be processed from the message queue and may parse the work order to identify, for example, a targeted IP range, port, service, protocol, etc. The identified information in the work order may be used to determine or generate a range of IP addresses or other device-identifying information. Scanner 206 may then attempt to communicate with identified devices via a network, such as distributed network 104. In a particular example, communicating with an identified device may include transmitting a ping request from system 200 to the identified device to determine whether the identified device, service and/or port are active. In another example, communicating with the identified device may include transmitting from system 200 to the identified device a data request for information, such as user information, device information, and/or network information. In aspects, if an identified device responds to the communication request, scanner 206 may add a device indicator (e.g., IP address, device name, etc.) for the identified device, or a representation thereof, to one or more job or message queues, such as a device indicator queue.

Protocol analyzer 208 may be configured to access the message queue (e.g., device indicator queue) and process device indicators. In examples, protocol analyzer 208 may select or receive a device indicator to be processed from the message queue and may parse the device indicator to identify, for example, one or more targeted IP ranges, ports, services, protocols, etc. associated with the device indicator. Using the parsed information, protocol analyzer 208 may identify and/or access a payload that is configured for the device associated with the device indicator. In at least one example, protocol analyzer 208 generates and transmits a request for a payload to an analyzing component, such as analyzer 210. The request may include work order data, device indicator data and the like.

Analyzer 210 may be configured to store and provide payloads. In aspects, a payload may to a file In examples, analyzer 210 may parse a received request from protocol analyzer 208 to determine one or more payloads corresponding to the request. In one example, this determination may be made by using a rule set accessible to analyzer 210. In an alternate example, this determination may be made by providing one or more portions of the parsed request to, for example, a machine-learned model accessible to analyzer 210. In aspects, the payloads may be provided to or generated by analyzer 210, and may be updated and/or modified manually or automatically according to a predefined schedule. For example, UI 202 may be used to provide, store and/or modify payloads on system 200. The payloads may include data that may be used to solicit a response from a device type indicated by a computing device and/or data that may be used to detect malicious content and/or behavior from a computing device. In some examples, a payload may be a file, a data packet, or a portion thereof (e.g., the body data of a data packet, as opposed to the header).

Protocol analyzer 208 may be further configured to transmit a payload. In examples, protocol analyzer 208 may transmit one or more received payloads to a computing device indicated by the device indicator. In at least one example, the one or more payloads may be combined into (or used to generate) a single payload. In another example, the one or more payloads may be sent sequentially and/or based on one or more criteria. In aspects, transmitting the payload to the computing device may include verifying information related to the identity of the computing device. For example, protocol analyzer 208 may attempt to identify and/or verify one or more digital certificates installed on the computing device. In a particular example, protocol analyzer 208 may attempt to verify the digital certificates by executing a certificate checking service or API accessible to system 200. The certificate checking service may check a digital certificate to determine whether the digital certificate is correctly installed on the computing device and shows the correct certificate details. In some aspects, if the one or more digital certificates installed on a computing device cannot be verified, protocol analyzer 208 may mark (or otherwise indicate that) the computing device and/or the associated device indicator as illegitimate or malicious.

Protocol analyzer 208 may be further configured to process a payload response. In examples, protocol analyzer 208 may receive one or more responses from the client device that received the one or more payloads. Protocol analyzer 208 may process the responses in order to detect malicious and/or malfunctioning devices and suspicious behavior. For example, protocol analyzer 208 may receive and parse a response to a payload including data that may be used to solicit a response from a device type indicated by a device. Protocol analyzer 208 may then compare the response data to a string or value that is expected for the device type. When the response data matches the expected string, protocol analyzer 208 may cause the computing device and/or the associated device indicator to be marked, flagged or otherwise designated as legitimate or non-malicious. In some examples, marking the computing device and/or the associated device indicator may include attaching an indication to the device indicator, storing the result in a data store, presenting the result to a user, etc. When the response data does not match an expected string, protocol analyzer 208 may cause the computing device and/or the associated device indicator to be marked, flagged or otherwise designated as illegitimate or malicious.

In aspects, alternately to or additionally to processing the payload including data that may be used to solicit a response from a computing device, protocol analyzer 208 may receive and parse a response to a payload including data that may be used to determine whether the response includes malicious content and/or the server exhibits malicious behavior. Protocol analyzer 208 may then use one or more pattern-matching techniques to compare the response data to known data. In some aspects, the known data may correspond to previously identified malicious and/or unauthorized data, scripts, services, techniques and/or entities. In such aspects, the response data and known data may be compared using rule-based techniques or machine-learned models. When the response data matches the known data or malicious content is otherwise determined in the response, protocol analyzer 208 may cause the computing device and/or the associated device indicator to be marked, flagged or otherwise designated as illegitimate or malicious. In one example, protocol analyzer 208 may mark a device indicator as malicious even though the device indicator may have been marked as legitimate and/or non-malicious previously in the payload analysis process.

Protocol analyzer 208 may be further configured to record the results of the payload analyses. In aspects, protocol analyzer 208 may record and/or store the result of the payload processing for one or more of the client identifiers. For example, protocol analyzer 208 may store the results of the packet processing described above in one or more tables of a database. The results may be stored according to, for example, device identifier, date/time, work order type, result, etc. In at least one example, the stored results may be made accessible to a user via, for example, UI 202. UI 202 may be configured to allow the stored data to be manipulated and presented in various formats (e.g., a historical analysis of a particular IP address, recent trends for particular protocols, aggregate totals of identified malicious content per port, etc.).

In some aspects, the various components of exemplary system 200 may scalable to account for the changing conditions, work demands and/or resource availability of exemplary system 200. For example, exemplary system 200 may allocate or assign a certain number of scanners when exemplary system 200 is initiated. As the number of requests received and/or work orders generated increases, or as the system processing usage increases, a threshold may be exceeded. The threshold may correspond to a selected or pre-defined metric, such as an amount of work orders, one or more system processing metrics, a time period (e.g., peak hours, weekends, maintenance hours, etc.), a system activity analysis, a number of active connections to the system, etc. In response to meeting or exceeding the threshold, exemplary system 200 may allocate, instantiate or otherwise initiate additional scanners to facilitate timely processing of the additional work orders or work order load. In such an example, when a value of the metric decreases to or below the threshold, exemplary system 200 may deallocate or deactivate a certain number of scanners; thereby, efficiently performing dynamic run-time scaling of the system based upon current system activity.

In another example, exemplary system 200 may additionally or alternately allocate or assign a certain number of protocol analyzers when exemplary system 200 is initiated. Based on the number of device indicators in the device indicator queue, exemplary system 200 may activate or deactivate a certain number of protocol analyzers. For instance, as the number of device indicators or device types for the device indicators increases, a threshold may be exceeded. As discussed above, the threshold may correspond to a selected or pre-defined metric. In response to meeting or exceeding the threshold, exemplary system 200 may allocate, instantiate or otherwise initiate additional protocol analyzers to facilitate timely processing of the additional device indicators and/or device indicator types. In such an example, when a value of the metric decreases to or below the threshold, exemplary system 200 may deallocate or deactivate a certain number of protocol analyzers.

Figure 3:
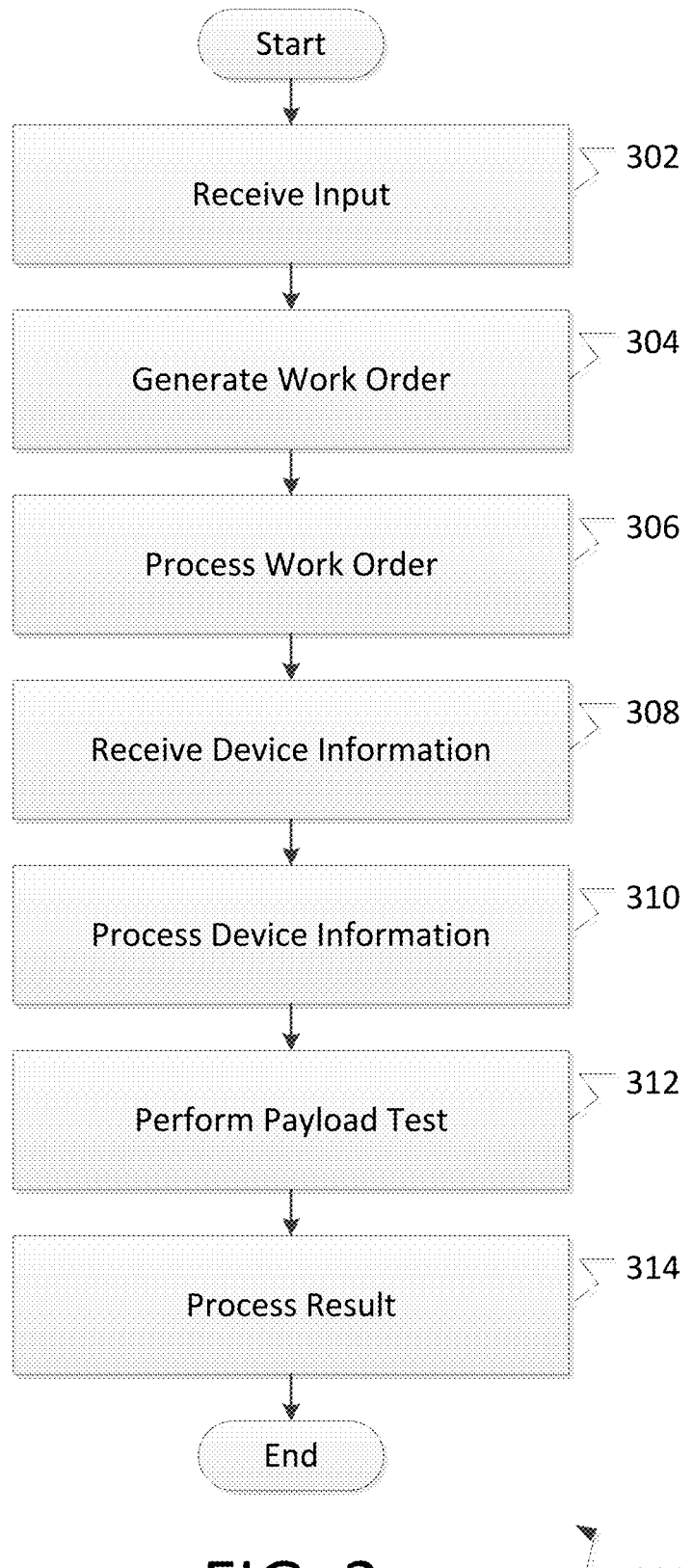
FIG. 3 illustrates an example method of providing real-time scanning of IP addresses as described herein.

FIG. 3 illustrates example methods of providing real-time scanning of IP addresses as described herein. In aspects, method 300 may be executed by an exemplary system such as system 200 of FIG. 2. In examples, method 300 may be executed on a device comprising at least one processor configured to store and execute operations, programs or instructions. However, method 300 are not limited to such examples. In other examples, method 300 may be performed on an application or service for real-time IP scanning. In at least one example, method 300 may be executed (e.g., computer-implemented operations) by one or more components of a distributed network, for instance, a web service/distributed network service (e.g. cloud service) to leverage real-time and/or approximately real-time IP scanning techniques.

Exemplary method 300 begins at operation 302 where input may be received by a real-time IP scanning system, such as exemplary system 200. In aspects, the input may be received from, for example, a client device via a user interface, such as UI 202. The user interface may include one or more of a web portal, an API and a command line utility. In some examples, the real-time IP scanning system may receive a request to initiate an on-demand scan or establish a schedule of scans, to access and/or manipulate one or more current or previous analyses (described more below), to generate and/or modify a payload (described more below), and the like. For example, the input may include an on-demand request to scan for malicious entities using ports 80 or 443 in the IPv4 space. In other examples, the real-time IP scanning system may receive one or more batch jobs including one or more requests to be processed at predefined times or according to certain criteria.

At operation 304, work orders may be generated using the input. In aspects, the data in the input may be used by, for example, control engine 204 to generate one or more work orders. In some aspects, the above exemplary on-demand request may be used to generate a single work order including a request to scan entities using ports 80 and 443 in the IPv4 space. In other aspects, the above exemplary on-demand request may be used to generate a plurality of work orders. In such aspects, the real-time IP scanning system may perform processing on the input prior to generating work orders. For example, the real-time IP scanning system may determine that, because the count of entities using ports 80 and 443 in the IPv4 space is above a predetermined threshold, a plurality of work orders are to be generated. In another example, the real-time IP scanning system may determine that each port (or service, protocol, etc.) in a request warrants a separate work order. In yet another example, the real-time IP scanning system may use system performance diagnostics (e.g., CPU load, idle processors, etc.) to determine the number of work orders to generate. In aspects, the generated work orders may be added to a queue or to a list of work orders.

At operation 306, work orders may be processed. In aspects, the work orders may be selected by or provided to one or more scanning components, such as scanner 206. The scanning components may be configured to communicate with and/or identify computing devices matching the requirements in a work order. In examples, the scanning components may select work orders from a work order queue based on one or more criteria. For example, the work order may be selected from the queue in a first-in, first-out (FIFO) method. In another example, the work orders may be selected from the queue based on the availability of a scanning component that can process the work order. In such as example, one or more scanning components may not be configured to process certain work order types and/or content. In yet another example, the work orders may be selected from the queue based on the current and/or anticipated resources of the real-time IP scanning system. For example, a work order comprising a potentially large number of identified computing devices may be bypassed in a queue by a scanning component in order for the scanning component to process a later-arriving work order comprising a potentially low number of identified computing devices. In yet another example, the work orders may be selected from the queue based on how recently a work order for the same (or a substantially similar) data has been processed. For example, a scanning component may bypass a work order if a work order for the same data is currently being processed, has recently processed, or is scheduled to be processed (e.g., as part of a batch job). In aspects, after accessing a work order, the real-time IP scanning system may attempt to communicate with each of the computing devices designated in the work order. For example, a scanning component that has accessed a work order to scan for entities using port 80, may provide a ping request, an Nmap request, or similar communication to each computing device in the IPv4 space that is currently using port 80.

At operation 308, device information may be received. In aspects, a real-time IP scanning system, such as exemplary system 200, may receive responses to the communication requests transmitted to the computing devices designated in the work order. In examples, the responses may comprise ping responses (or similar communication). In such examples, information identifying the computing devices (e.g., IP address, hostname, URL, etc.) may be identified and extracted from the response. In one example, the identifying information may be identified using regular expression matching techniques. In some aspects, the identified and/or extracted information may be added to a queue or similar data structure. For example, IP addresses extracted from ping responses may be added to an IP address queue comprising the IP addresses of one or more computing devices identified in the work order. As another example, IP addresses, ports, and/or device type-identifying information extracted from a Nmap response may be added to a database table or file.

At operation 310, device information may be processed. In aspects, the device data (e.g., IP address, hostname, URL, etc.) may be selected by or provided to one or more protocol analyzers, such as protocol analyzer 208. In examples, the protocol analyzers may select device data from a device data queue or database table based on one or more criteria, as described in operation 306. The selected device data may be used to identify a payload corresponding to the computing device identified by the device data. For example, device data may indicate that a computing device is a mail server that has an open SMTP service on port 25. Using this information, a protocol analyzer may search for, identify and/or receive a payload from, for example, analyzer 210 that is configured to solicit a response from a mail server. In a particular example, a protocol analyzer may search a data repository of payloads for a category, such as device type (e.g., mail server). The payload may include, for example, a mail server-specific command, such as HELO (e.g., an SMTP command that identifies a sender device and initiates an SMTP conversation). In aspects, such a payload may additionally or alternately include data to detect the malicious behavior of a service, protocol, and/or entity. For example, the payload may include data generated using pattern matching techniques on known data from content such as malicious scripts, phishing sites, botnets, open web proxies, and the like. In such aspects, the known data may be generated and/or modified manually or automatically at regular intervals. For example, the known data may be updated using a threat description list, a virus definition list, an antivirus service, etc.

At operation 312, a payload test may be performed. In aspects, a protocol analyzer, such as protocol analyzer 208, may transmit one or more payloads to the computing device identified by the device data, and the protocol analyzer may receive one or more responses from the computing device. In examples, the responses may include a reply to a device-type specific command or prompt an expected action. For example, in response to the above HELO command, the computing device may send a response that includes the expected string "250 Hello." As a result, the protocol analyzer may mark, flag or otherwise designate the computing device and/or the associated device data as legitimate, non-malicious, or the like. In an alternate example, in response to the above HELO command, the computing device may not send a response or may send a response that does not include an expected or acceptable string, value and/or action. As a result, the protocol analyzer may mark, flag or otherwise designate the computing device and/or the associated device data as illegitimate, malicious or otherwise non-conforming.

In some examples, the responses may additionally or alternatively include malicious content and/or links to malicious content, or prompt malicious behavior. For example, the computing device may embed a malicious script and/or a link to a phishing website in the response. As a result, the protocol analyzer (having identified at least the presence of the malicious content) may mark, flag or otherwise designate the computing device and/or the associated device data as illegitimate, malicious or otherwise non-conforming. In a particular example, in response to the above HELO command, the computing device may send a plurality of responses. The first response may include the expected string "250 Hello." As a result, the protocol analyzer may first mark the computing device and/or the associated device data as non-malicious. The second response, however, may include an unexpected string and/or malicious content. As a result, the protocol analyzer may mark the computing device and/or the associated device data as malicious. Alternately, the protocol analyzer may refrain from marking the computing device and/or the associated device data until the all of the responses for the computing device have been identified and processed as malicious. In such an example, the protocol analyzer may simply provide an indicator that the computing device and/or the associated device data are malicious or non-conforming.

At operation 314, results of the payload analysis may be processed. In aspects, one or more payload analyzers, such as protocol analyzer 208, may record and/or store the result of the payload processing for one or more computing devices. In examples, a protocol analyzer may store the results of the packet processing described above in one or more data stores. The results may be stored according to, for example, device identifier, date/time, work order type, result, or the like. In at least one example, the stored results may be made accessible to a user via an interface, such as a web portal, a UI or an API. The interface may be configured to allow the stored data to be manipulated and presented in various formats (e.g., a historical analysis of a particular IP address, recent trends for particular protocols, aggregate totals of identified malicious content per port, etc.).

Figure 4:
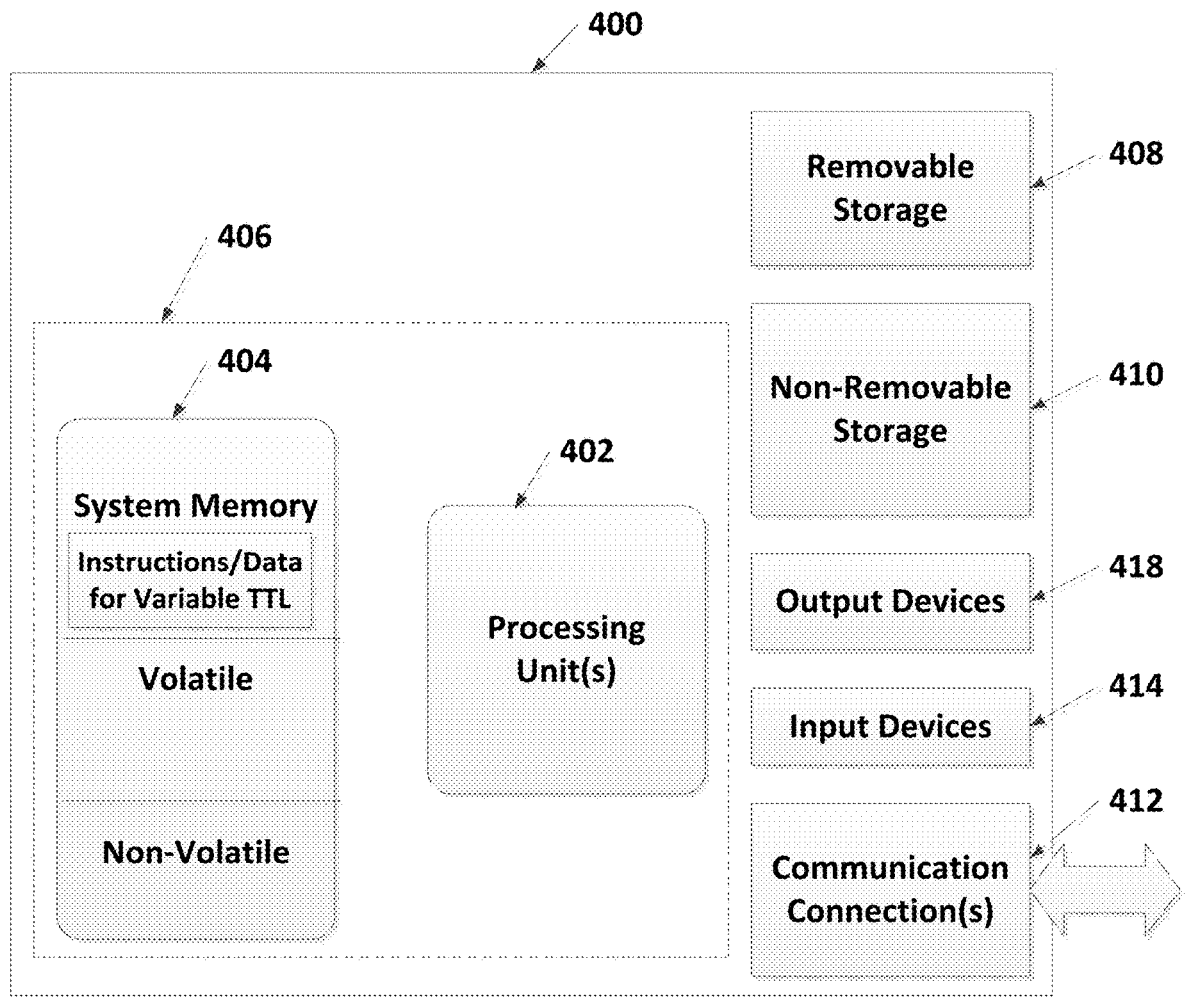
FIG. 4 illustrates one example of a suitable operating environment 400 in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, reputation information, category information, cached entries, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one hardware processor; and
    memory coupled to the at least one hardware processor, the memory comprising computer executable instructions that, when executed by the at least one hardware processor, performs a method for providing real-time scanning of IP addresses, the method comprising:
        receiving, at a server device, input comprising at least request details for generating a request to scan one or more IP addresses of an internet protocol;
        generating one or more work orders based on the request details;
        processing the one or more work orders, the processing comprising communicating with one or more computing devices identified by the one or more work orders;
        receiving device information from the one or more computing devices, the device information identifying a device type for each of the one or more computing devices;
        providing the device information to a plurality of analyzer components of the system, wherein the plurality of analyzer components are configured to execute against the internet protocol in real-time;
        providing, by the plurality of analyzer components, the device type for the one or more computing devices to a machine learning model, wherein the machine learning model uses the device type to select one or more payloads for the one or more computing devices;
        providing the selected one or more payloads to the one or more computing devices, wherein the each of the one or more payloads is configured to solicit a response from the identified device type; and
        based on the one or more payloads, receiving one or more responses from the one or more computing devices.

2. The system of claim 1, wherein the request details include at least one of: client data, timer data, device information and network information.

3. The system of claim 1, wherein the processing further comprising:
    accessing, by a scanner, the one or more work orders;
    determining communication criteria based on the one or more work orders; and
    identifying the one or more computing devices associated with the communication criteria.

4. The system of claim 3, wherein identifying the one or more computing devices comprises:
    transmitting, by the scanner, a communication request to the one or more computing devices, the communication request comprising at least one of: an IP address and a port.

5. The system of claim 1, wherein receiving the device information comprises:
    receiving, by the server device, one or more communication responses to the communication request, the one or more communication responses comprising the device information; and
    storing the device information in a queue.

6. The system of claim 1, the method further comprising:
    accessing, by a protocol analyzer, the received device information; and
    determining one or more payloads associated with the received device information.

7. The system of claim 6, wherein determining the one or more payloads comprises:
    determining a device type of a computing device using the device information;
    identifying an expected response for the device type;
    identifying at least one payload corresponding to the determined device type; and
    accessing an analyzer, the analyzer having access to the at least one payload.

8. The system of claim 7, wherein the at least one payload comprises at least one of:
    commands corresponding to the expected response; and
    data to detect malicious content.

9. The system of claim 8, wherein the data is generated using pattern matching techniques on known data from the malicious content.

10. The system of claim 1, the method further comprising:
    when the received one or more responses comprises an expected string, identifying the one or more computing devices associated with the one or more responses as non-malicious; and
    when the received one or more responses do not comprise the expected string, identifying the one or more computing devices associated with the one or more responses as malicious.

11. The system of claim 10, the method further comprising:

storing, in a data store, results corresponding to the identified one or more computing devices.

12. The system of claim 10, the method further comprising:
presenting a user interface to view results corresponding to the identified one or more computing devices.

13. The method for providing real-time scanning of IP addresses, the method comprising:
receiving, at a server device, an input comprising at least request details for generating a request to scan one or more IP addresses of an internet protocol;
generating one or more work orders based on the request details;
processing the one or more work orders, the processing comprising communicating with one or more computing devices identified by the one or more work orders;
receiving device information from the one or more computing devices, the device information identifying a device type for each of the one or more computing devices;
providing the device information to a plurality of analyzer components of the server device, wherein the plurality of analyzer components are configured to execute against the internet protocol in real-time;
providing, by the plurality of analyzer components, the device type for the one or more computing devices to a machine learning model, wherein the machine learning model uses the device type to select one or more payloads for the one or more computing devices;
providing the selected one or more payloads to the one or more computing devices, wherein the each of the one or more payloads is configured to solicit a response from the identified device type; and
based on the one or more payloads, receiving one or more responses from the one or more computing devices.

14. The method of claim 13, wherein the processing further comprising:
accessing the one or more work orders to determine communication criteria;
identifying the one or more computing devices associated with the communication criteria; and
transmitting a communication request to the identified one or more computing devices.

15. The method of claim 13, wherein receiving the device information comprises:
receiving one or more communication responses to the communication request, the one or more communication responses comprising the device information; and
storing the device information in a queue.

16. The method of claim 13, the method further comprising:
accessing the received device information;
using the device information, determining a device type of the one or more computing devices;
identifying an expected response for the device type; and
identifying at least one payload corresponding to the determined device type.

17. The method of claim 16, wherein the at least one payload comprises at least one of:
commands corresponding to the expected response; and
detection data to detect malicious content, wherein the detection data is generated using pattern matching techniques on known malicious content.

18. The method of claim 17, further comprising:
determining whether the received one or more responses includes an expected string, the expected string corresponding to at least a portion of the expected response;
when the received one or more responses is determined to include the expected string, marking the device information associated with the one or more responses as non-malicious;
when the received one or more responses is determined to not include the expected string, marking the device information associated with the one or more responses as malicious.

19. The method of claim 18, further comprising:
based on the marked device information, generating results;
storing the results; and
providing the results to a user.

20. A computer-readable media not consisting of a propagated data signal, the computer-readable media storing computer executable instructions that when executed cause a computing system to perform a method for providing real-time scanning of IP addresses, the method comprising:
receiving, at a server device, an input comprising at least request details for generating a request to scan one or more IP addresses of an internet protocol;
generating one or more work orders based on the request details;
processing the one or more work orders, the processing comprising:
accessing the one or more work orders to determine communication criteria;
identifying one or more computing devices associated with the communication criteria; and
transmitting a communication request to the identified one or more computing devices;
receiving one or more communication responses to the communication request, the one or more communication responses comprising device information, the device information comprising internet protocol information for the internet protocol;
determining a device type of the one or more computing devices using the received internet protocol information;
identifying an expected response for the device type;
providing the device information to a plurality of analyzer components of the system, wherein the plurality of analyzer components are configured to execute against the internet protocol in real-time;
providing, by the plurality of analyzer components, the device type for the one or more computing devices to a machine learning model, wherein the machine learning model uses the device type to select at least one payload for the one or more computing devices, the at least one payload comprising at least one of:
commands corresponding to the expected response; and
detection data to detect malicious content, wherein the detection data is generated using reverse engineering techniques on known malicious content;
providing the selected at least one payload to the one or more computing devices;
based on the one or more payloads, receiving one or more responses from the one or more computing devices;
determining whether the received one or more responses includes an expected string; and
when the one or more responses is determined to not include the expected string, marking the device information associated with the one or more responses as malicious.

* * * * *